Sept. 23, 1924.                                                            1,509,364
                              H. S. MEEK
                              CAR BRAKE
                           Filed May 22, 1923
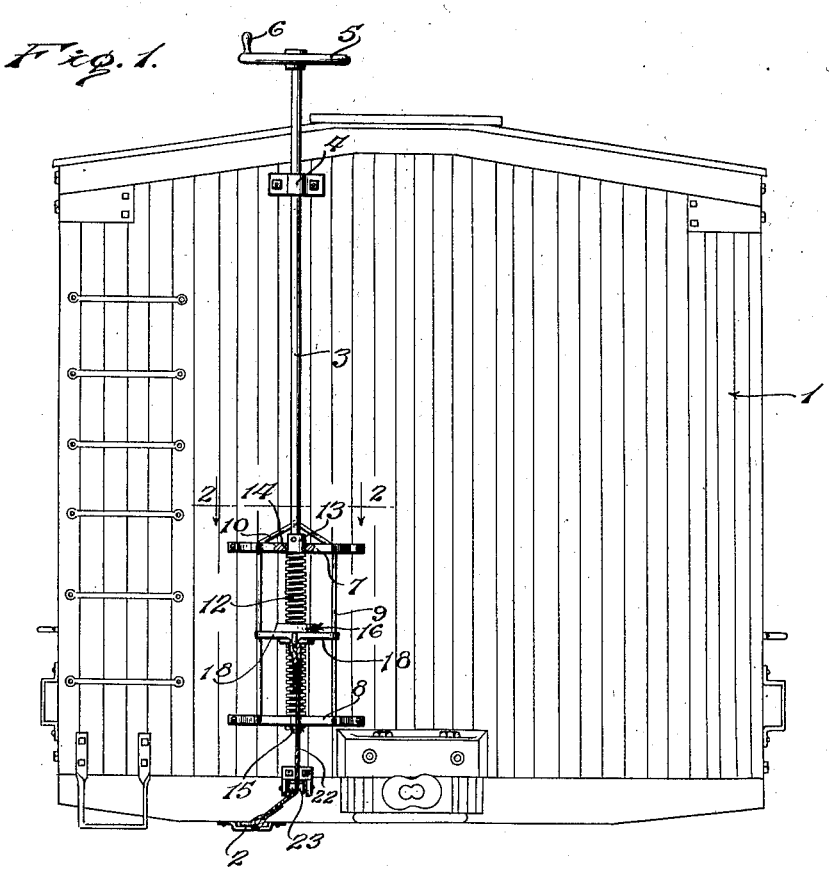
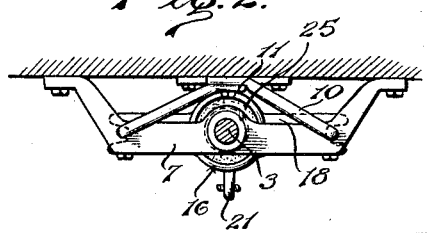
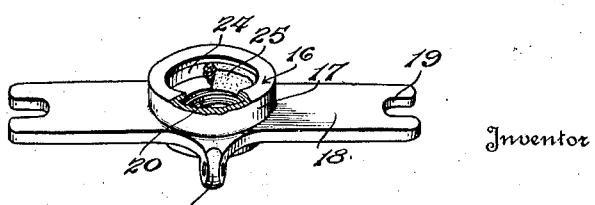
Inventor
Harry S. Meek
By
Lacey & Lacey, Attorney Patented Sept. 23, 1924.

1,509,364

UNITED STATES PATENT OFFICE.

HARRY S. MEEK, OF NEEDLES, CALIFORNIA.

CAR BRAKE.

Application filed May 22, 1923. Serial No. 640,737.

*To all whom it may concern:*

Be it known that I, HARRY S. MEEK, a citizen of the United States, residing at Needles, in the county of San Bernardino and State of California, have invented certain new and useful Improvements in Car Brakes, of which the following is a specification.

This invention relates to an improvement in railway car brakes and more particularly to that class of brakes which are installed upon freight cars.

The ordinary brake of the type referred to above presents many disadvantages which render it unsafe for use. Such brakes ordinarily embody a ratchet which is fixed upon the staff of the brake, and a pawl which is so mounted as to coact with the ratchet so that the staff will be held in its various positions of rotative adjustment. However, these pawls soon become worn or loose and as a consequence they will not properly engage the ratchet, and the brake becomes practically useless. Furthermore, under such conditions, the pawl is liable to suddenly release the ratchet, and in most instances at a critical moment, resulting in damage to the car and probably its contents, or to another car which it might strike, as well as in injury to the brakeman. In other instances the ratchets become loose upon the staff with similar consequences. Also, in brakes of the type mentioned, as ordinarily constructed, a chain, which is connected to the brake rod, is wound upon a small drum upon the staff of the brake, and it frequently happens that the chain will wind in such a way that at a critical moment it will slip, resulting in the brakeman being thrown from the top of the car. It is also found that in the operation of such brakes, great difficulty is often experienced in setting the brake with a sufficient degree of firmness to obtain the desired braking effect. It will be evident that all of these conditions contribute to accidents to the brakemen, and damage to the cars and to the goods contained therein. In consideration of the foregoing it is one of the primary objects of the present invention to provide a brake which may be operated with less exertion than the ordinary type of brake and may consequently be more firmly set so as to obtain any desired degree of braking effect, and this without the employment of brake "plugs" to obtain additional leverage.

Another important object of the invention is to provide a brake which will automatically maintain the adjustment at which it is set, so that there can be no slippage or sudden release as in the previously employed types of brakes.

Another object of the invention is to provide a brake so constructed that with minimum exertion on the part of the brakeman, it may be operated to set the brake with any desired degree of braking effect and will maintain its adjustment without any likelihood of a disarrangement or mutual release of its parts.

In the accompanying drawing:

Figure 1 is a view in elevation of a brake constructed in accordance with the present invention installed upon the end of a freight car;

Figure 2 is a detail horizontal sectional view on the line 2—2 of Figure 1;

Figure 3 is a perspective view, partly in section, and with parts broken away, illustrating the adjusting head of the brake.

In the drawings, the numeral 1 indicates an ordinary freight car, and the numeral 2 the rod of the usual brake (not shown) which is installed upon the car. As previously stated, a chain is ordinarily connected to the end of this rod, and is wound upon a drum fixed upon the staff of the brake, which staff is rotated by hand so as to take up or pay out the chain and thus set or release the brake. In the present structure the brake staff is indicated by the numeral 3 and the same is mounted in suitable bearings 4 upon the end of the car 1, in the usual manner, the staff being provided at its upper end with the usual hand wheel 5 and handle 6.

Upper and lower bracket members 7 and 8 are bolted or otherwise secured to the end of the car, and guide rods 9 are secured at their lower ends in the lower bracket 8 and extend at their upper portions through the upper bracket 7 and have their portions which lie above the said bracket 7, extended inwardly toward each other, as at 10, the ends of these portions being bolted or otherwise secured, as at 11, to the end of the car. The rods 9 constitute guides for a purpose to be presently explained, and they extend vertically in parallel relation as will be evident by reference to Figure 1. The numeral 12 indicates a worm which is provided with a reduced upper end 13 mounted rotatably in a bearing 14 formed in the upper bracket 7, the lower end of the worm being likewise reduced in diameter, as at 15, and mounted in a similar bearing in the lower bracket 8. The lower end of the staff 3 is set into and fixed with relation to the upper end 13 of the said worm 12 so that rotation of the shaft will effect rotation of the worm. The numeral 16 indicates in general a head having a central hub portion 17 and oppositely extending arms 18 which are provided in their ends with notches 19 adapting them to have sliding engagement with the rods 9. The hub portion 17 is interiorly threaded as at 20 and fits the worm 12, it being understood at this point that rotation of the worm through rotation of the staff 3 will effect vertical upward or downward adjustment of the said head 16, the head being held against rotation and being guided by the rods 9. An eye 21 is formed upon the head, and a cable or other flexible connection 22 is connected at one end to this eye and at its other end to the brake rod 2, the intermediate portion of the cable being passed about an anti-friction roller or pulley 23 mounted upon one end sill of the car 1.

From the foregoing description of the invention it will be evident that by grasping the hand wheel 5 or the handle 6 and rotating the staff 3, rotary motion will be imparted to the worm 12 to effect vertical adjustment of the head 16 either in an upward or in a downward direction. When the head is adjusted upwardly, a pull will be exerted upon the cable 22 to draw upon the brake rod 2 and to set the brakes. On the other hand, when the head 16 is adjusted downwardly, the cable will be slackened, and the brakes will be released. It will also be evident that due to the provision of a worm as the adjusting medium for the head 16, the head will be automatically locked at all points in its adjustment, so that the brakeman may release his hold upon the hand wheel 5 or handle 6, at any moment, with the assurance that the brakes will not release, or the adjustment thereof which has been obtained, be in any way disturbed. Obviously, therefore, the accidents which are incident to the operation of the ordinary brake of this type, cannot occur with the brake of the present invention which will stay in any position in which it may be set. Furthermore, because of the employment of the worm 12 as an adjusting medium for the head 16, less energy will be required to be exerted by the brakeman in setting the brakes.

In order that the worm and head 16 may be suitably lubricated, the head 16 is provided upon its upper side with an annular seat 24 which surrounds the opening in the hub 17 of the head, and a packing 25 of felt, waste, or any other material, of a suitable nature, is arranged within the seat and is saturated with lubricating oil. The packing 25 will, of course, be of annular form and of an internal diameter preferably not greater than that of the worm 12, so that the oil will be supplied to the threads of the said worm and from these threads to the threads 20 of the head.

Having thus described the invention, what is claimed as new is:

In a car brake, the combination of vertically spaced brackets, vertical guides extending between the brackets, a worm journaled in the brackets and arranged parallel with the guides, a head comprising a central hub and arms extending from the hub, the hub having an annular seat at its upper end and being internally threaded at its lower end to engage the worm and the arms having notches at their ends to slidably engage the guides, a lubricant holder in the seat at the upper end of the hub, an eye on the front side of the head, a flexible element secured in said eye and adapted to be connected to a brake rod, and means for rotating the worm.

In testimony whereof I affix my signature.

HARRY S. MEEK. [L. S.]